Dec. 18, 1945.   J. BRENZINGER   2,391,292
WELDING DEVICE
Filed Jan. 15, 1944   3 Sheets-Sheet 1

INVENTOR.
Julius Brenzinger
BY
ATTORNEY

Dec. 18, 1945.  J. BRENZINGER  2,391,292
WELDING DEVICE
Filed Jan. 15, 1944  3 Sheets-Sheet 2
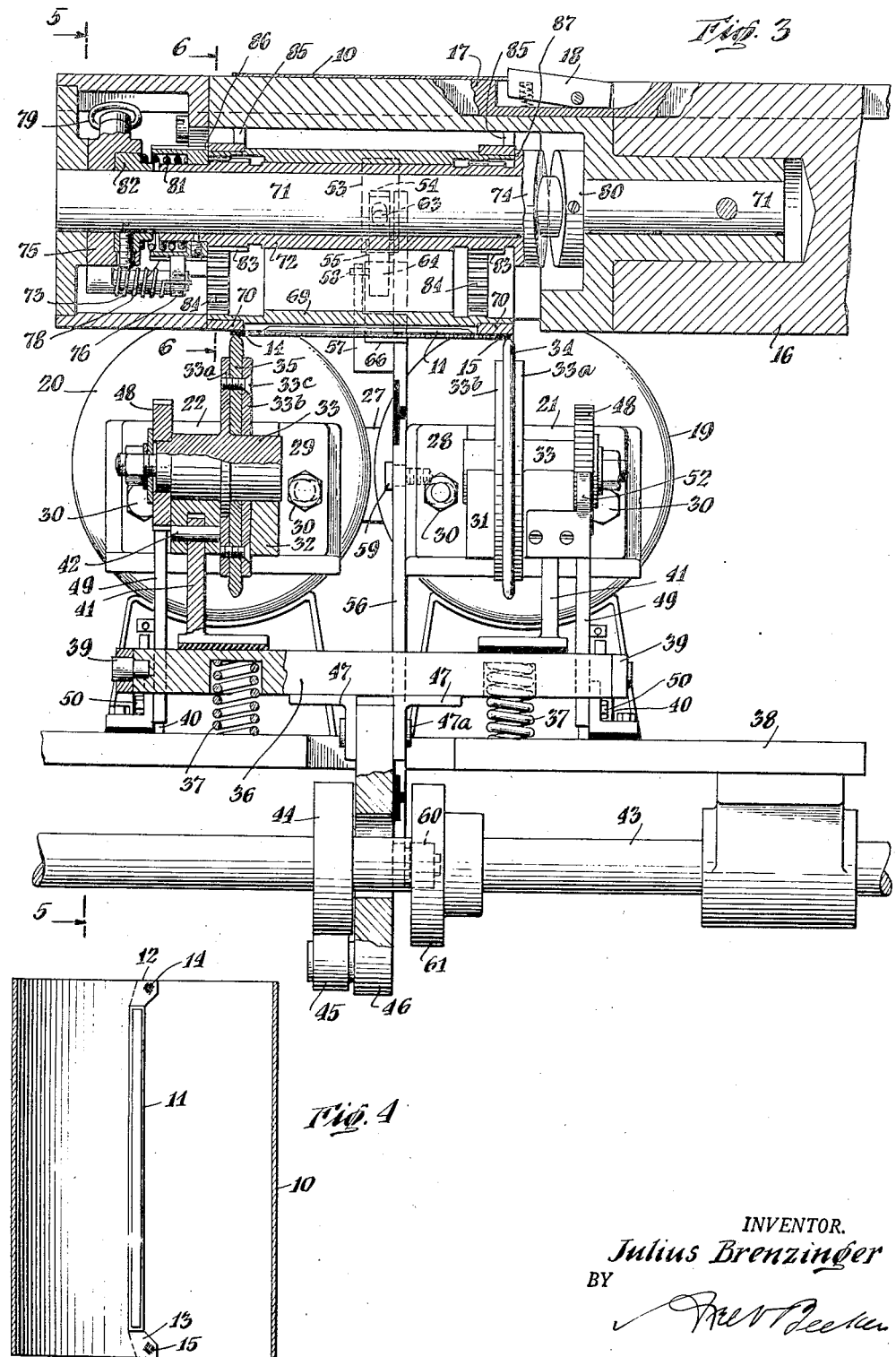
INVENTOR.
Julius Brenzinger
BY
ATTORNEY

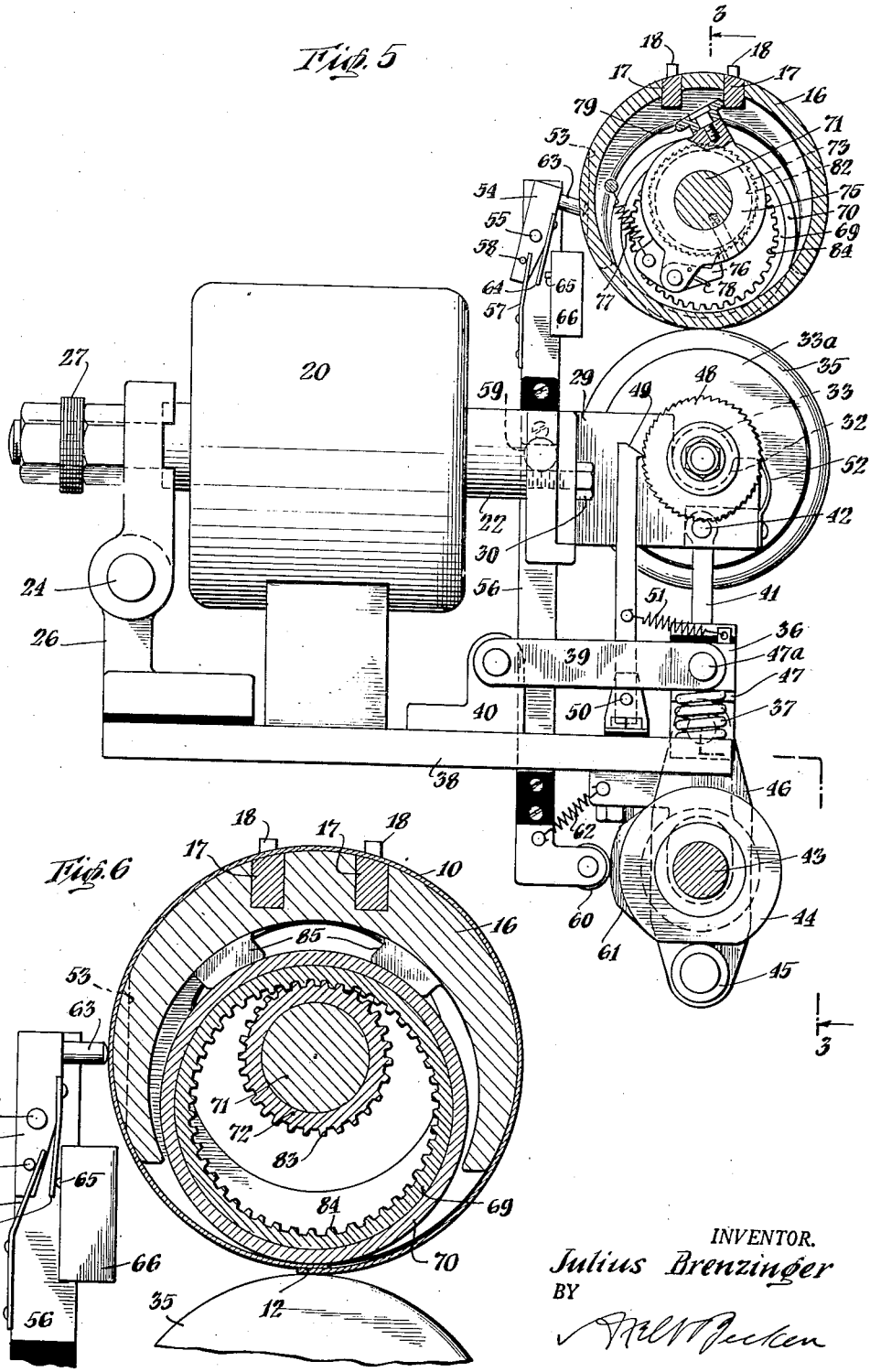

Patented Dec. 18, 1945

2,391,292

UNITED STATES PATENT OFFICE 2,391,292

WELDING DEVICE

Julius Brenzinger, Fairfield, Conn., assignor to The Max Ams Machine Company, Bridgeport, Conn., a corporation of Connecticut Application January 15, 1944, Serial No. 518,341

2 Claims. (Cl. 219—6)

This invention relates to welding devices, especially such that employ a transformer as part of the welding means and which are used in the welding of overlapped flanges in two spaced-apart welding zones of a hollow body of sheet-material such as a can-body. The invention has for its main object and feature the provision of means whereby the welds in the different zones will be of substantially uniform character, i. e. that the same volume of current will pass through both welding zones so that the two welds will have substantially equal strength, and that welds in successive bodies will be of substantially uniform character, and to do this by simple means, capable of acting in quick succession and without the necessity of frequent substitution of parts.

In the accompanying drawings, the invention is disclosed in a concrete and presently preferred form, in which:

Fig. 3 is a vertical sectional view substantially on the plane of line 3—3 of Fig. 5;

Fig. 4 is a longitudinal sectional view of a can-body constituting an example of the work to be acted upon by the device;

Fig. 5 is a vertical sectional view substantially on the plane of line 5—5 of Fig. 3; and Fig. 6 is a vertical sectional view, on an enlarged scale, substantially on the plane of line 6—6 of Fig. 3.

Figure 1:
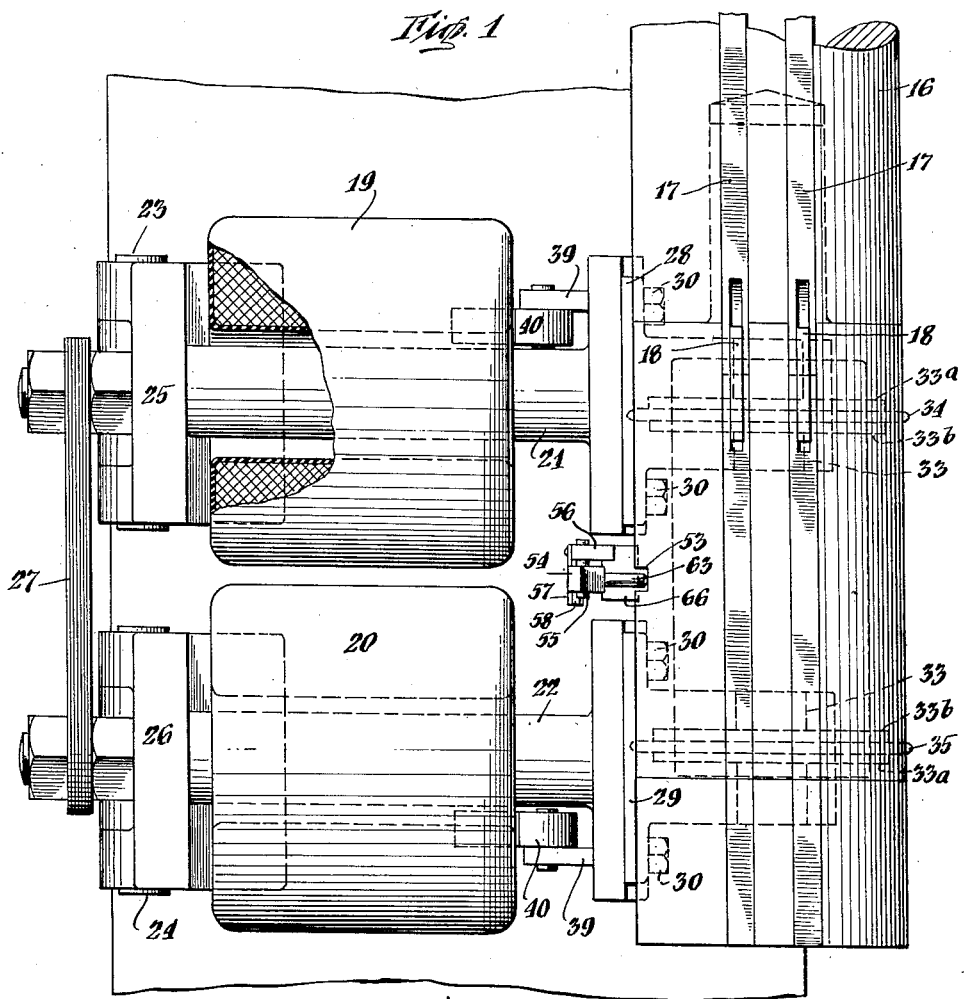
Fig. 1 is a top plan view, partly in section, of a device embodying the invention.

It will facilitate an understanding of the invention if reference is first made to Fig. 4 which shows a can-body 10 having a side seam 11, for the greater part of its length, composed of the usual interlocking hooks well known in the art. At the upper and lower ends of said hollow body, it is provided with over-lapping flanges 12 and 13, and it is these flanges it is desired to weld together for the purpose clearly described in my Patent No. 1,542,662 of June 16, 1925. Reference numbers 14 and 15 indicate the two welds or welding zones of the hollow body, and it will be apparent that said welding zones are spaced apart lengthwise of said hollow body.

In accordance with well-understood practice in the art, hollow bodies such as 10 are advanced over a horn 16 by suitable means such as reciprocatory feeding members 17 having the conventional spring-pressed dogs 18 that engage the end of hollow body 10 to advance it over the horn. During its passage over the horn, the can-body can be subjected to various operations, one of which can be a welding operation, and it is the means for carrying out such welding operation that constitutes the subject matter of the instant invention.

19 and 20 indicate the primaries and 21 and 22 the secondaries of a transformer. Each secondary is pivotally supported at 23 or 24 independently of the other in suitable bearings 25 or 26, and extends through its complementary primary. Said secondaries are connected in series at their pivotally supported ends by flexible means such as strips 27 to permit said secondaries to swing about their pivots to a slightly different extent. At their free ends, said secondaries are provided with brackets 28 or 29 bolted thereto by bolts 30. Brackets 28 or 29 have open bearings 31 or 32 to receive pintles 33 of rotatable terminal members 34 or 35 of the secondaries aforesaid. These terminal members are adapted to engage body 10 at the spaced-apart welding zones 14 and 15. Specifically, pintle 33 is provided with an integral upstanding flange 33a forming a cheek-plate for one side of the terminal member, and to which it is attached by means of another cheek-plate 33b and screws 33c.

36 is a lifting device to move said secondaries about their pivotal supports 23 and 24 to cause said terminal members to be engaged with and disengaged from hollow body 10. As here shown, said lifting device is in the nature of a platform yieldingly supported by means of springs 37 on framework 38, and pivotally connected by means of links 39 to brackets 40 also on the framework. 41 are supporting members carried by platform 36 and connected at 42 with bearings 31 or 32 of brackets 28 or 29. 43 is a rotating shaft carrying a cam 44, and engaging with this cam is a cam roller 45 on a lever 46 connected as by means of angle-plates 47 and pivots 47a to platform 36. Springs 37 tend to urge platform 36 upwardly to bring rotatable terminal members 34 and 35 into contact with hollow body 10 under a yielding pressure, and cam 44 acts to pull said terminal members downwardly away from said hollow body.

Suitable means are provided to intermittently turn rotatable terminal members 34 and 35 a fraction of a revolution. In the present instance, each pintle 33 carries a ratchet 48, with which is associated a pawl 49, pivotally supported at 50, that is urged into engagement with said ratchet by means of a spring 51. It will be understood that each time the secondaries, and therefore the terminal members, move upwardly, each ratchet 48 is turned the distance of one tooth. 52 is a stop-pawl engaging the ratchet to prevent backward rotation. The welding operation leaves a slight tin deposit on the terminal members, and the slight turning movement of these is for the purpose of presenting a clean new surface in the welding zone so as to have the welding action substantially uniform on successive hollow bodies. The secondaries, strips 27, brackets 28 and 29, bearings 31 and 32, pintles 33, flanges 33a, cheek-plates 33b, and terminal members 34 and 35 are all made of good conductive material such as copper.

Figure 2:
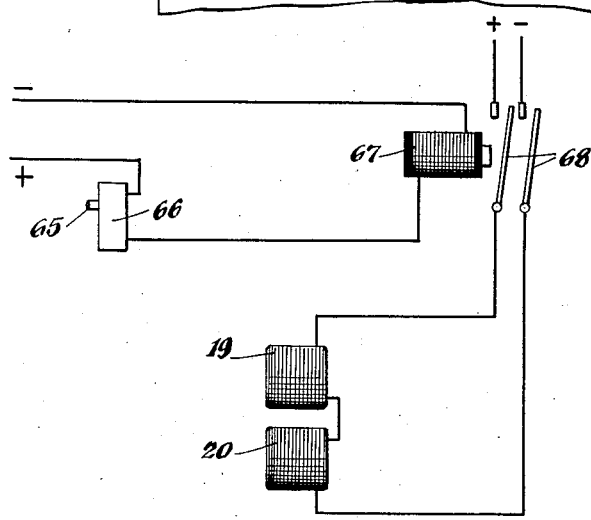
Fig. 2 is a diagrammatic view of the circuits than can be utilized in connection with the device.

Horn 16 is provided with a recess 53 in its surface which is covered by a hollow body 10 when the latter comes into position to be welded. 54 is a circuit-closing member biased to occupy a non-operating position, being pivoted at 55 on the upper end of lever 56 and urged into the tilted position shown in Fig. 5 by means of spring 57, carried by lever 56, acting against pin 58. Lever 56 is pivoted at 59 and carries at its lower end a cam roll 60 to engage cam 61 on shaft 43. A spring 62 tends to urge cam roll 60 against cam 61. Cam 61 is so timed that it rocks the upper end of lever 56 toward horn 16 when, in the normal operation of the device, a body 10 covers recess 53 of said horn. Circuit-closing member 54 is provided with a detector finger 63 which, in the event that there is no body 10 in position on the horn, enters recess 53, in consequence of which said circuit-closing member remains in non-operating position (Fig. 5). But, if a body 10 is in position as in Fig. 6, then the detector finger encounters said body and moves the circuit-closing member into operating position. Such movement into operating position can, of course, be utilized in many ways to close a circuit through primaries 19 and 20. In the present instance, member 54 carries a spring 64 which, in the circumstances just recited, presses upon a control button 65 and closes a contact in switch 66 (Fig. 2) and energizes a magnet 67, which, in turn, closes double-throw switch 68 and establishes a circuit in series through primaries 19 and 20. After the welds are made, the upper portion of lever 56 is moved away from the horn, by rotation of cam 61 and consequently the circuit through primaries 19 and 20 is broken. Thus the transformer is intermittently energized to correspond with the advance of a body 10 into welding position and, if no body 10 arrives at said welding position, the circuit through primaries 19 and 20 is not closed.

So far, the connections from the secondaries up to terminal members 34 and 35 at the welding zones have been traced, and it is now remains to show how the distance between said welding zones is bridged.

69 is a conductive member, carried by the horn, to engage the interior surface of hollow body 10 and to bridge the distance between the two welding zones. Preferably, this member is in the form of a sleeve provided with removable rings 70 in the welding zones. Member 69 and rings 70 are of good conductive material, such as copper, and said rings are removable so that the tin deposit thereon, due to the welding action, can be cleaned off without the necessity of removing sleeve 69. For the purpose of presenting new contact surfaces during successive welding operations, means are provided to intermittently vary the position of conductive member 69. In the present instance, said conductive member is given both a rotating and a lengthwise back-and-forth movement, the resultant of which could be called an undulating movement. Specifically the means for mounting, and varying the position of, conductive member 69 are as follows: 71 is a stationary shaft mounted within the horn. Rotatably and slidably mounted on said shaft is a sleeve 72 which at one end carries a ratchet 73 and at its other end a cam 74. Mounted loosely on shaft 71, at a point adjacent ratchet 73, is a ring 75 carrying a pivotally supported pawl 76. A spring 77 tends to urge said ring in one direction, and another spring 78 tends to urge pawl 76 into engagement with ratchet 73. Ring 75 carries an abutment roller 79 with which reciprocatory member 17 engages, as a cam, on its stroke in one direction to thereby turn ring 75 against the action of spring 77. This causes pawl 76 to turn ratchet 73 the distance of one tooth, thus imparting one step to sleeve 72 and cam 74. Adjacent cam 74 is another and stationary cam 80, and it will be understood that engagement of the faces of cams 74 and 80 will cause sleeve 72 to move back and forth lengthwise. A spring 81 interposed between a stationary member 82 and a portion of ratchet 73, carried by sleeve 72, serves to keep cams 74 and 80 in contact at all times. Formed integrally with sleeve 72 are two pinions 83. Conductive member 69 is in the form of a shell, having internal gears 84 to mesh with pinions 83. This shell 69 is a floating member that merely hangs on sleeve 72, suitable guides 85 being provided on the horn to keep it in position. Said shell also moves lengthwise with sleeve 72 by being interposed between projections 86 and 87 of said sleeve 72.

From the foregoing it will be understood that, when a body 10 is moved into welding position, reciprocatory member 17, through the connections described, will turn and move endwise conductive member or shell 69 so as to present clean contact surfaces in the welding zones. Also, rotation of cam 44 will move terminal members 34 and 35 upwardly, secondaries 21 and 22 turning on their pivots 23 and 24, whereby said terminal members will engage body 10 under yielding pressure that allows a slight discrepancy in the turning movement of said secondaries. During the rising movement of terminal members 34 and 35, they are given a slight turning movement by the interaction of ratchets 48 and pawls 49 so as to present clain contact surfaces in the welding zones. A body 10 being in position to cover recess 53, the circuit-closing member carried by lever 56 will be moved into operating position, when the upper end of said lever 56 is moved toward the horn by cam 61. This establishes a momentary circuit through primaries 19 and 20, and induces a circuit in secondaries 21 and 22, strips 27, terminal members 34 and 35, overlapping flanges 12 and 13 of body 10 and conductive member 69.

I claim:

1. In a device for welding overlapped flanges of a hollow body of sheet-material, in which device a transformer, having primaries and secondaries, is employed as part of the welding means, and in which device said hollow body is advanced on a horn, means to establish an energizing circuit through said primaries including: in combination with said horn, having a recessed portion to be covered by said hollow body; of a circuit-closing element biased to occupy a non-operative position and to be moved to an operative position only by engagement with a hollow body covering said recessed portion of said horn; and means to periodically move said circuit-closing element toward and away from said recessed portion of said horn in timed relation to the presence of a hollow body covering the recessed portion aforesaid.

2. In a device for welding overlapped flanges of a hollow body of sheet-material, in which device a transformer, having primaries and secondaries, is employed as part of the welding means, and in which device said hollow body is advanced on a horn; two pinions supported interiorly of said horn; means to rotate said pinions step by step; and a conductive member to form a part of the circuit through said secondaries, said conductive member comprising a shell having interior gears to be supported by, and mesh with, said pinions.

JULIUS BRENZINGER.